United States Patent
Kimura et al.

(10) Patent No.: US 10,190,014 B2
(45) Date of Patent: *Jan. 29, 2019

(54) SURFACE-TREATING AGENT FOR VULCANIZED RUBBER

(71) Applicant: NOK CORPORATION, Tokyo (JP)

(72) Inventors: Natsumi Kimura, Kanagawa (JP); Katsumi Abe, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/512,017

(22) PCT Filed: Sep. 18, 2015

(86) PCT No.: PCT/JP2015/076800
§ 371 (c)(1),
(2) Date: Mar. 16, 2017

(87) PCT Pub. No.: WO2016/047641
PCT Pub. Date: Mar. 31, 2016

(65) Prior Publication Data
US 2017/0283642 A1    Oct. 5, 2017

(30) Foreign Application Priority Data

Sep. 22, 2014 (JP) ................. 2014-192212

(51) Int. Cl.
| | | |
|---|---|---|
| *C08K 3/34* | (2006.01) |
| *C09D 127/12* | (2006.01) |
| *C09D 7/40* | (2018.01) |
| *C09D 109/00* | (2006.01) |
| *C09D 175/04* | (2006.01) |
| *C08L 15/00* | (2006.01) |
| *C08L 27/12* | (2006.01) |
| *C08L 83/04* | (2006.01) |
| *F16J 15/3204* | (2016.01) |
| *B32B 25/16* | (2006.01) |
| *B32B 27/26* | (2006.01) |
| *C08F 214/18* | (2006.01) |
| *C08L 15/02* | (2006.01) |
| *C08G 18/69* | (2006.01) |
| *C08G 18/10* | (2006.01) |

(52) U.S. Cl.
CPC ............ *C09D 127/12* (2013.01); *B32B 25/16* (2013.01); *B32B 27/26* (2013.01); *C08F 214/18* (2013.01); *C08G 18/10* (2013.01); *C08G 18/69* (2013.01); *C08K 3/34* (2013.01); *C08L 15/00* (2013.01); *C08L 15/02* (2013.01); *C08L 27/12* (2013.01); *C08L 83/04* (2013.01); *C09D 7/40* (2018.01); *C09D 109/00* (2013.01); *C09D 175/04* (2013.01); *F16J 15/3204* (2013.01); *C08L 2666/06* (2013.01); *C08L 2666/32* (2013.01)

(58) Field of Classification Search
CPC ........ C08K 3/34; C08F 214/18; C09D 127/12
See application file for complete search history.

(56) References Cited

U.S. PATENT DOCUMENTS

| | | | | |
|---|---|---|---|---|
| 4,472,286 | A * | 9/1984 | Falk ..................... | C07D 213/20 252/2 |
| 9,156,998 | B2 * | 10/2015 | Higashira ............... | B32B 15/06 |
| 9,228,153 | B2 * | 1/2016 | Kunieda ............ | C08G 18/3206 |
| 2006/0148971 | A1 * | 7/2006 | Jing ........................ | C08J 3/005 524/520 |

FOREIGN PATENT DOCUMENTS

| | | |
|---|---|---|
| JP | 03-252442 | 11/1991 |
| JP | 07-165953 | 6/1995 |
| JP | 2003-213122 | 7/2003 |
| JP | 3449014 | 7/2003 |
| JP | 2007-332269 A | 12/2007 |
| JP | 2008-189892 A | 8/2008 |
| JP | 2011-089074 | 5/2011 |
| JP | 4997708 | 5/2012 |

OTHER PUBLICATIONS

International Preliminary Report on Patentability and Written Opinion from Corresponding PCT application No. PCT/JP2015/076800 dated Mar. 28, 2017 (7pgs).
International Search Report from corresponding PCT application No. PCT/JP2015/076800 dated Dec. 28, 2015 (4 pgs).

* cited by examiner

*Primary Examiner* — Hannah J Pak
(74) *Attorney, Agent, or Firm* — Brinks Gilson & Lione

(57) ABSTRACT

A surface-treating agent for vulcanized rubber, comprising, based on 100 parts by weight, as solid matters, of isocyanate group-containing 1,2-polybutadiene, an organic solvent solution containing 10 to 160 parts by weight of fluororesin particles and 2.5 to 20 parts by weight of a perfluoroalkyl group-containing oligomer-based, fluorine-containing surfactant as a dispersant. The surface-treating agent for vulcanized rubber improves the solution stability of the organic solvent solution, improves the further hardness of the entire coating film formed from the surface-treating agent, abrasion resistance, and product torque evaluation, and is effectively used as, for example, a coating agent for seal lip parts of oil seals.

7 Claims, No Drawings

SURFACE-TREATING AGENT FOR VULCANIZED RUBBER

RELATED APPLICATION

This application is a 35 U.S.C. § 371 national phase filing of International Patent Application No. PCT/JP2015/076800, filed Sep. 18, 2015, which claims priority under 35 U.S.C. § 119 to Japanese Patent Application No. 2014-192212, filed Sep. 22, 2014, the entire disclosure of which is hereby expressly incorporated by reference.

TECHNICAL FIELD

The present invention relates to a surface-treating agent for vulcanized rubber. More particularly, the present invention relates to a surface-treating agent for vulcanized rubber that further improves the hardness of the entire coating film, abrasion resistance, and product torque evaluation.

BACKGROUND ART

Graphite coating films, coating films of metal salts or amides of fatty acids, waxes such as paraffin, silicone oil, and the like, or coating films containing ethyl cellulose, phenolic resin, or the like as a binder are conventionally formed on the surface of rubber layers of rubber-coated metal gaskets, or on the surface of rubber elastic sliding parts, such as bearing seals and oil seals, for the purpose of preventing fixing, inhibiting blocking, and improving abrasion resistance. Engine gaskets, and the like are used under the conditions of a high surface pressure and high temperature. When the vibration of an engine is further added to these conditions, the rubber coating layer on the surface of the gasket is abraded, and gas leakage may occur. Moreover, the rubber coating layer of rubber elastic sliding parts, such as bearing seals and oil seals, is abraded due to repeated sliding, and oil leakage may occur.

Accordingly, as a surface-treating agent for vulcanized rubber that hardly results in a phenomenon in which the rubber coating layer on the gasket surface is abraded or damaged even under severe service conditions, including high surface pressure and high temperature, as well as vibration, i.e., the use environment of engine head gaskets, and that can form a rubber layer of a gasket effective for gas sealing, the present applicant previously proposed a surface-treating agent for vulcanized rubber in which an aqueous dispersion of polyolefin resin is added to liquid hydroxyl group-containing 1,2-polybutadiene and isocyanate group-containing 1,2-polybutadiene as a curing agent thereof (Patent Document 1).

The surface-treating agent for vulcanized rubber proposed in Patent Document 1 achieved the intended purpose of improving the abrasion resistance of the rubber coating layer. However, due to the use of an aqueous dispersion, water promoted the reaction between the hydroxyl group and the isocyanate grouping the 1,2-polybutadiene, and water also reacted with the isocyanate group itself; thus the viscosity of the surface-treating dispersion was increased, and gelation occurred. This caused the problem of poor workability during the coating process. Furthermore, as a result of the reaction between water and the isocyanate group, importing high molecular weight to 1,2-polybutadiene was prevented, and there were drawbacks that the abrasion resistance, peeling resistance, and sliding properties of the surface treatment layer were inferior.

In order to solve the above problems, the present applicant further proposed a surface-treating agent for vulcanized rubber that uses an organic solvent dispersion of polyolefin resin in place of an aqueous dispersion of polyolefin resin (Patent Document 2). However, this method did not use a fluororesin, such as polytetrafluoroethylene, and there was thus a problem that the coating film was peeled due to adhesion during high temperature compression, and friction and abrasion at high surface pressure.

As a surface-treating agent for vulcanized rubber that does not lead to the peeling of a coating film due to adhesion during high temperature compression, and friction and abrasion at high surface pressure, without impairing the performance conventionally required for surface-treating agents for vulcanized rubber, such as prevention of fixing, inhibition of blocking, and improvement of abrasion resistance, the present applicant further proposed a surface-treating agent for vulcanized rubber comprising an organic solvent solution comprising 10 to 160 parts by weight of wax having a softening point of 40 to 160° C. and 10 to 160 parts by weight of fluororesin, based on 100 parts by weight of isocyanate group-containing 1,2-polybutadiene or a 1,2-polybutadiene mixture of isocyanate group-containing 1,2-polybutadiene and hydroxyl group-containing 1,2-polybutadiene (Patent Document 3).

PRIOR ART DOCUMENTS

Patent Documents

Patent Document 1: JP-A-3-252442
Patent Document 2: JP-A-7-165953
Patent Document 3: JP-A-2003-213122
Patent Document 4: JP-B-4997708
Patent Document 5: JP-A-2011-89074
Patent Document 6: JP-B-3449014

OUTLINE OF THE INVENTION

Problem to be Solved by the Invention

An object of the present invention is to provide a surface-treating agent for vulcanized rubber comprising, as an essential component, an organic solvent solution of isocyanate group-containing 1,2-polybutadiene and fluororesin particles, which further improves the solution stability of the organic solvent solution, the hardness of the entire coating film formed from the surface-treating agent, abrasion resistance, and product torque evaluation.

Means for Solving the Problem

The above object of the present invention can be achieved by a surface-treating agent for vulcanized rubber comprising, based on 100 parts by weight, as solid matters, of isocyanate group-containing 1,2-polybutadiene, an organic solvent solution containing 10 to 160 parts by weight of fluororesin particles and 2.5 to 20 parts by weight of a perfluoroalkyl group-containing oligomer-based, fluorine-containing surfactant as a dispersant.

Effect of the Invention

In the prior art, fluororesin particles were compounded as a filler component of a coating agent to thereby reduce friction and improve abrasion resistance. However, the wax component compounded as a dispersant for fluororesin particles described in Patent Document 3 reduced the hardness of the binder component, and it was thus difficult to harden the coating film.

In the present invention, a hard coating film can be obtained, without reducing the hardness of the binder component, by replacing the wax component with a specific fluorine-containing surfactant dispersant. Simultaneously, the solution stability of a surface-treating agent for vulcanized rubber, which is prepared as an organic solvent solution, is increased; that is, fluororesin particles are effectively dispersed in the organic solvent solution, and the precipitation of the particles is effectively suppressed. Consequently, the workability during coating application can be improved, and a uniform and stable film can be formed. Furthermore, the addition of even a small amount of dispersant is effective. The fluororesin particles can be well dispersed without reducing the hardness of the coating film.

Moreover, the deformation of the seal lip part of the oil seal can be suppressed by forming a hard coating film. Consequently, abrasion resistance and product torque evaluation can be improved.

The surface-treating agent for vulcanized rubber according to the present invention is not only effectively applied to seal parts, such as seal lip parts of oil seals, but also effective to prevent the adhesion, reduce the friction, and improve the abrasion resistance of rubber parts, such as rubber rolls and rubber belts for copying machines, rubber hoses and rubber belts for industrial use, and wipers, weather strips, and glass runs for automobiles.

EMBODIMENTS FOR CARRYING OUT THE INVENTION

As the isocyanate group-containing 1,2-polybutadiene, one having a molecular weight of about 1,000 to 3,000 in which an isocyanate group is added as a terminal group is used. This can be a commercial product having a solid matters content of about 3 to 70 wt. %, for example, Nisso TP-1001 (produced by Nippon Soda Co., Ltd.; a butyl acetate solution having a solid matters content of 50 wt. %) can be used as it is. The polybutadiene resin can react with the functional groups on the surface of the vulcanized rubber and with the hydroxyl group-containing component for bonding and curing. The affinity and compatibility of the polybutadiene resin with rubber are superior to those of polyurethane resins that similarly react with an isocyanate group to achieve a higher molecular weight. Thus, the polybutadiene resin is characterized by excellent adhesion with rubber, particularly excellent friction and abrasion resistance characteristics.

Moreover, the isocyanate group-containing 1,2-polybutadiene, in which an isocyanate group is added as a terminal group, reacts with the functional groups on the surface of the vulcanized rubber and with the hydroxyl group-containing 1,2-polybutadiene, which is an optional component, to achieve a high molecular weight. The isocyanate group-containing 1,2-polybutadiene can also be used as a curing agent for the hydroxyl group-containing 1,2-polybutadiene. As the hydroxyl group-containing 1,2-polybutadiene used in this case, in which a hydroxyl group is added as a terminal group, one having a molecular weight of about 1000 to 3000 is used. Commercial products, such as Nisso G-1000, C-1000, GQ-1000, and GQ-2000 (produced by Nippon Soda Co., Ltd.), can be used as they are.

When isocyanate group-containing 1,2-polybutadiene and hydroxyl group-containing 1,2-polybutadiene are used as a mixture, the isocyanate group-containing 1,2-polybutadiene is used at a ratio of 25 wt. % or more, preferably 40 to 100 wt. %, as solid matters; and the hydroxyl group-containing 1,2-polybutadiene is used at a ratio of 75 wt. % or less, preferably 0 to 60 wt. %, as solid matters. If the amount of the isocyanate group-containing 1,2-polybutadiene is less than this range, the adhesion with rubber decreases, thereby reducing sliding properties and non-adhesiveness, and also reducing friction and abrasion resistance characteristics.

Examples of fluororesin particles include particulate polytetrafluoroethylene [PTFE], tetrafluoroethylene/hexafluoropropylene copolymers, tetrafluoroethylene/perfluoro(alkyl vinyl ether) copolymers, polyvinylidene fluoride, polyvinyl fluoride, ethylene/tetrafluoroethylene copolymers, and the like.

Usable examples of such fluororesin particles include particles prepared by classifying a fluororesin obtained by block polymerization, suspension polymerization, solution polymerization, emulsion polymerization, or the like to a particle size of about 0.1 to 5 μm; particles prepared by finely dispersing a dispersion obtained by suspension polymerization, solution polymerization, emulsion polymerization, or the like, by shear stirring, etc., to a particle size of about 0.1 to 5 μm; or particles prepared by coagulating and drying a product obtained by polymerization mentioned above, followed by atomization to a particle size of about 10 μm or less by dry grinding or cooling grinding. In the particle size set to be about 0.1 to 10 μm, a smaller particle size brings an advantage that the coating thickness can be reduced; however, the unevenness of the coating surface becomes small, thereby reducing the contact area. Accordingly, the friction coefficient tends to increase at a low surface pressure. In contrast, a larger particle size increases the coating thickness, and thus causes a higher coating cost; however, the unevenness becomes large, and the contact area with a mating material becomes small at a low surface pressure. Accordingly, the friction coefficient tends to decrease. Therefore, the particle size is suitably adjusted depending on use demand. For example, for use in seal parts, the particle size is determined in consideration of these advantages and disadvantages, and particles having a particle size of about 0.5 to 2 μm are preferably used.

The fluororesin particles are used at a ratio of 10 to 160 parts by weight, preferably 25 to 125 parts by weight, based on 100 parts by weight of the solid matters of the isocyanate group-containing 1,2-polybutadiene, optionally in the form of an organic solvent solution or dispersion. If the ratio of the fluororesin particles is greater than this range, the adhesion with rubber, and the friction and abrasion resistance characteristics are reduced, and the flexibility of the film is impaired. Consequently, cracks are formed on the cured coating film. In contrast, if the ratio of the fluororesin particles is less than this range, sliding properties and non-adhesiveness tend to be reduced. When the surface-treating agent for vulcanized rubber of the present invention is used for seal parts, etc., the amount of the fluororesin particles is preferably 25 to 120 parts by weight.

As the fluorine-containing surfactant, which serves as a dispersant, a perfluoroalkyl group-containing oligomer-based surfactant containing a perfluoroalkyl group having 6 or less carbon atoms is used. For example, an oligomer (solubility in water at 25° C.: 0.1% or less), which is prepared by copolymerizing a (meth)acrylate monomer having a $C_1$-$C_6$ perfluoroalkyl group as a hydrophobic group with a (meth)acrylate monomer that is a macromonomer (molecular weight: about 2000 to 10000) having a polyoxyalkylene group, such as polyoxyethylene or polyoxypropylene, as a hydrophilic group, is used (Patent Document 4). In this case, a polymerization initiator is used in an amount of about 0.1 to 0.6 moles per mole of the ethylenically unsaturated group in the monomer to achieve an oligomerization reaction. Other monomers, such as 2-hydroxyethyl acrylate, can be simultaneously copolymerized. Comparatively, a simple ethyleneoxide addition type one (solubility in water at 25° C.: 1% or more) has insufficient solution stability, and is not so effective to improve abrasion resistance.

Practically, commercial products, such as Surflon S-611 (produced by AGC Seimi Chemical Co., Ltd.), F-561 (produced by DIC Corporation), and the like, are used as they are. They are insoluble in water, and have a solubility of about 1 to 10 wt. %, or 10 wt. % or higher in some cases, in isopropanol, methanol, methyl ethyl ketone, methyl isobutyl ketone, ethyl acetate, propyleneglycol monomethyl ether acetate, toluene, etc. Thus, they may be supplied in the form of organic solvent solutions. Moreover, they have a surface tension of about 23 mN/m for toluene and propyleneglycol monomethyl ether acetate as a 0.1% solution.

Such a fluorine-containing surfactant dispersant is used at a ratio of about 2.5 to 20 parts by weight, preferably about 5 to 20 parts by weight, based on 100 parts by weight of the solid matters of the isocyanate group-containing 1,2-polybutadiene. If the amount of the dispersant used is less than this range, the dispersibility of the fluororesin particles is deteriorated, thereby not only causing sedimentation, but also failing to sufficiently improve abrasion resistance. In contrast, if the amount of the dispersant used is greater than this range, the binder hardness decreases, and the torque increases.

Patent Document 5 discloses a coating composition comprising such a fluorine-containing surfactant dispersant, a binder resin, a fluoro-based resin as a solid lubricant, and an organic solvent. The binder resin used therein is a polyamideimide resin, a polyimide resin, an epoxy resin, or an acrylic resin. The Examples of Patent Document 5 indicate that wettability and a nitric acid resistance test (chemical resistance) satisfied the acceptable criteria. However, the same results were also obtained when an ethyleneoxide addition type (number of EO groups=12 or 18) fluorine-containing surfactant was used. This is a difference from the present invention.

The surface-treating agent for vulcanized rubber according to the present invention can be also used by adding an OH group-containing fluororesin composition solution having the following formulation and/or silicone oil therein.

The OH group-containing fluororesin composition used as an organic solvent solution comprises about 10 to 50 wt. %, as solid matters content, of a composition comprising:
 [I] a copolymer of
  (A) a perfluoroalkylalkyl (meth)acrylate and
  (B) a hydroxyl group-containing (meth)acrylate,
 [II] a polymer of an acrylic acid alkyl ester,
 [III] a polymer of a fluorinated olefin, and
 [IV] a curing agent;
wherein the weight ratio of the copolymer [I], the polymer [II], and the polymer [III] is 2 to 15:35 to 70:20 to 50 (total: 100): etc.

Since the OH group-containing fluororesin composition solution has an OH-modified group, it can effectively react with the isocyanate group-containing 1,2-polybutadiene, which is a binder component, to form a stable and highly durable film. The details of the OH group-containing fluororesin composition are described, for example, in Patent Document 6. Moreover, as the organic solvent, for example, a methyl isobutyl ketone-ethyl acetate-methyl ethyl ketone mixed solvent or the like is used.

As the hydroxyl group-containing (meth)acrylate, which is the component (B) of the copolymer [I], for example, 2-hydroxyethyl (meth)acrylate or the like is used. The polymer [II] is an important component in terms of adhesion with a substrate, compatibility with other components, and formation of a film that satisfies the need. As the polymer [III], for example, a vinylidene fluoride-based polymer or the like is used. The polymer [III] is located in an intermediate position between the copolymer [I], which is a surface component, and the polymer [II], which is an adhesion component, in the cross-sectional direction of the film, and serves as a barrier layer for preventing the transfer of additives, such as a pigment, a dye, and a plasticizer, contained in the substrate resin to the coating layer. As the curing agent [IV], an organic compound having a reactive functional group reactive with OH groups, such as an isocyanate group or an epoxy group, is used at a ratio of about 0.001 to 100 wt. % based on the total amount of the polymers [I], [II], and [III].

As the OH-containing fluororesin composition solution, commercial products, such as Defensa TR-101 (OH value: 6.0 mgKOH/g solution), 102 (OH value: 2.7 mgKOH/g solution), and 103 (OH value: 4.1 mgKOH/g solution) (all of which are produced by DIC Corporation), are practically used.

The OH group-containing fluororesin composition solution is used at a ratio of about 100 parts by weight or less, preferably about 10 to 65 parts by weight, as solid matters, based on 100 parts by weight of the solid matters of the isocyanate group-containing 1,2-polybutadiene. The use of the OH group-containing fluororesin composition solution is effective to improve the abrasion resistance of a coating film to be formed; however, if the OH group-containing fluororesin composition solution is used at a ratio greater than the above range, the abrasion resistance is not improved.

The silicone oil used in the present invention may be non-modified type one, such as dimethyl silicone oil or phenyl methyl silicone oil, or a modified type one that has a functional group, such as an epoxy group, an amino group, or a mercapto group. However, the viscosity of the silicone oil must be 8,000 cs (8 Pa·s) or higher. If the viscosity of the silicone oil is less than 8,000 cs, the adhesion with the rubber substrate is insufficient. Practically, commercial products, such as non-modified silicone oils (e.q. KF-96H-1,000,000 cs, KF-96H-10,000 cs, and the like, produced by Shin-Etsu Chemical Co., Ltd.), and epoxy-modified silicone oils (e. q. KF-1001 and the like, produced by Shin-Etsu Chemical Co., Ltd.) are used.

The silicone oil is used at a ratio of about 60 parts by weight or less, preferably about 10 to 40 parts by weight, based on 100 parts by weight of the solid matters of the isocyanate group-containing 1,2-polybutadiene. If the silicone oil is used at a ratio greater than the above range, the abrasion resistance of the coating film is deteriorated, and it results in stickiness of the film surface.

As the organic solvent, toluene, xylene, ethyl acetate, butyl acetate, methyl ethyl ketone, methyl isobutyl ketone, and the like are used singly or as a mixed solvent. The dilution amount with the organic solvent is suitably selected depending on the coating thickness (film thickness) and the coating method. In general, it is set so that the total solid matters content is about 3 to 20 wt. %, preferably about 5 to 15 wt. %. The film thickness is generally 1 to 10 μm, preferably 2 to 5 μm. If the film thickness is less than this range, the entire rubber surface cannot be coated, and sliding properties and non-adhesiveness may be impaired. In contrast, if the film thickness is greater than this range, the stiffness of the coating surface is higher, and sealing properties and flexibility may be impaired. The film thickness is preferably about 1 to 5 μm for use in seal parts and the like.

Examples of the rubber that can be treated with such a surface-treating agent include fluororubber, nitrile rubber, hydrogenated nitrile rubber, ethylene-propylene rubber, styrene-butadiene rubber, acrylic rubber, chloroprene rubber, butyl rubber, natural rubber, and other general rubber materials. Among these, rubber materials having little blooming of an antioxidant, oil, and the like, which are compounded in the rubber, to the rubber surface layer, are preferably used. The compounding proportion of each component, the type of organic solvent, the amount of organic solvent, and the organic solvent mixing ratio are suitably selected depending on the rubber material and the purpose.

Examples of the coating method of the vulcanized rubber surface-treating agent to a rubber surface include, but are not limited thereto, dipping, spraying, roll coater, flow coater, and the like. In this case, it is preferable that dirt, and the like, on the rubber surface are previously removed by washing or the like before the surface-treating agent is applied. In particular, washing with water, a detergent, a solvent, etc., and drying are performed when blooming and bleeding from the vulcanized rubber are deposited on the surface.

After the vulcanized rubber surface-treating agent is applied to the rubber surface, heat treatment is performed at about 150 to 250° C. for about 10 minutes to 24 hours for calcining. If the heating temperature is lower than this range or the heating time is shorter than this range, the curing of the film and the adhesion with the rubber are insufficient, and non-adhesiveness and sliding properties are deteriorated. In contrast, if the heating temperature is higher than this range or the heating time is longer than this range, heat aging of the rubber occurs. Therefore, it is necessary to suitably set the heating temperature and heating time depending on the heat resistance of various rubbers.

Moreover, for vulcanized rubber for which a reduction in the amount of outgassing is required, heat treatment, reduced pressure treatment, extraction treatment, etc., can be performed singly or in combination; however, heat treatment is economically the best. In order to reduce the amount of outgassing, heat treatment at about 150 to 250° C. for about 1 to 24 hours is preferable. A higher temperature and a longer time are more effective to gasify low-molecular components in the rubber, and low-molecular components contained in the wax and polybutadiene in the film.

EXAMPLES

The following describes the present invention with reference to Examples.

Example 1

| | |
|---|---|
| PTFE resin particles (Fluon 172J, produced by AGC Seimi Chemical Co., Ltd.; particle size: 0.2 μm) | 22 parts by weight |
| Oligomer-based, fluorine-containing surfactant (Surflon S-611, produced by AGC Seimi Chemical Co., Ltd.) | 4 parts by weight |
| NCO group-containing 1,2-polybutadiene (TP-1001, produced by Nippon Soda Co., Ltd.; a butyl acetate solution having a solid matters content of 50 wt. %) | 98 parts by weight |
| Butyl acetate [AcOBu] | 876 parts by weight |

A surface-treating agent comprising the above components (total: 1000 parts by weight) was prepared, and each of the following items was measured and evaluated.

Solution stability: The surface-treating agent was prepared in a glass vessel, and the presence of precipitation was visually observed over time.

(Evaluation)
○: No sedimentation
Δ: Occurred after a while
X: Occurred immediately Binder hardness: Only the binder component of the coating agent (except for the fluororesin particle component) was applied to a metal plate so that the film thickness was 50 μm, and calcined at 200° C. for 10 hours to prepare a sample. Using a dynamic ultra-micro hardness tester (produced by Shimadzu Corporation), a triangular pyramid indenter (tip angle: 115°) was pressed into the sample at a load speed of 14.1 mN/sec, and the dynamic hardness when the pressing depth was 10 μm was measured.

The value is preferably 10 to 30.

Friction coefficient: The coating agent was applied to the surface of fluororubber (thickness: 2 mm) molded by vulcanization compression to a film thickness of 10 μm, and calcined at 200° C. for 10 hours to prepare a sample. Using HEIDON TYPE 14DR (produced by Shinto Scientific Co., Ltd.), a steel ball (diameter: 10 mm) with a load of 50 g was pressed to the surface of the coating film, and moved for a reciprocating distance of 50 mm at a speed of 50 mm/min. Then, the dynamic friction coefficient was measured.

(Evaluation)
○: less than 0.13
Δ: 0.13 or more and less than 0.17
X: 0.17 or more Abrasion resistance test: The coating agent was applied to the surface of fluororubber (thickness: 2 mm) molded by vulcanization compression to a film thickness of 10 μm, and calcined at 200° C. for 10 hours to prepare a sample. Using a Friction Player FPR-2000 (produced by Rhesca Co., Ltd.), an indenter ball (diameter: 3 mm) with a load of 2 kg was pressed to the surface of the coating film, and rotated with an average surface pressure of 3.9 MPa at a linear speed of 20.9 cm/sec. Then, the number of rotations until the coating film was peeled so that the rubber was exposed was measured.

(Evaluation)
⊚: 150,000 rotations or more
○: 50,000 rotations or more and less than 150,000 rotations
Δ: 10,000 rotations or more and less than 50,000 rotations
X: less than 10,000 rotations Product evaluation: Torque values were measured using a rotation tester for torque measurement at a rotation frequency of 500 to 8000 rpm at an oil temperature of 80° C.

(Evaluation)
○: Torque value was lower than that of conventional product
Δ: Torque value was equivalent to that of conventional product
X: Torque value was higher than that of conventional product

Example 2

In Example 1, the amount of the NCO group-containing 1,2-polybutadiene was changed to 77 parts by weight, the amount of butyl acetate was changed to 868 parts by weight, respectively, and 29 parts by weight of an OH group-containing fluororesin composition solution (Defensa TR-103, produced by DIC Corporation; OH value: 4.1 mgKOH/g solution, a MIBK-AcOBu-MEK mixed solvent solution having a solid matters content of 30 wt. %) was further used.

Example 3

In Example 1, the amount of the PTFE resin particles was changed to 21 parts by weight, the amount of the NCO group-containing 1,2-polybutadiene was changed to 90 parts by weight, the amount of butyl acetate was changed to 878 parts by weight, respectively, and 8 parts by weight of silicone oil (KF-96H-1,000,000 cs, produced by Shin-Etsu Chemical Co., Ltd.) was further used.

Example 4

| | |
|---|---|
| PTFE resin particles (Fluon 172J) | 37 parts by weight |
| Fluorine-containing surfactant (Surflon S-611) | 4 parts by weight |
| NCO group-containing 1,2-polybutadiene (TP-1001) | 74 parts by weight |
| Butyl acetate | 885 parts by weight |

A surface-treating agent comprising the above components was prepared, and the same measurement and evaluation as in Example 1 were performed.

Example 5

In Example 4, the amount of the NCO group-containing 1,2-polybutadiene was changed to 59 parts by weight, the amount of butyl acetate was changed to 879 parts by weight, respectively, and 22 parts by weight of an OH group-containing fluororesin composition solution (Defensa TR-103) was further used.

Example 6

In Example 4, the amount of the PTFE resin particles was changed to 34 parts by weight, the amount of the NCO group-containing 1,2-polybutadiene was changed to 68 parts by weight, the amount of butyl acetate was changed to 886 parts by weight, respectively, and 8 parts by weight of silicone oil (KF-96H-1,000,000 cs) was further used.

Example 7

In Example 1, the same amount (4 parts by weight) of F-561 (produced by DIC Corporation) was used as an oligomer-based, fluorine-containing surfactant.

Comparative Example 1

In Example 1, the same amount (4 parts by weight) of Surflon S-243 (ethyleneoxide addition type, produced by AGC Seimi Chemical Co., Ltd.) was used as a fluorine-containing surfactant.

Comparative Example 2

In Example 1, the same amount (4 parts by weight) of F-444 (ethyleneoxide addition type, produced by DICCorporation) was used as a fluorine-containing surfactant.

Comparative Example 3

In Example 1, the amount of the butyl acetate was changed to 880 parts by weight, and oligomer-based, fluorine-containing surfactant was not used.

Comparative Example 4

In Example 1, the amount of the fluorine-containing surfactant was changed to 1 part by weight, and the amount of butyl acetate was changed to 879 parts by weight, respectively.

Comparative Example 5

| | |
|---|---|
| Fluororesin particle solution (a butyl acetate solution having a solid matters content of 5 wt. %) | 365 parts by weight |
| PE wax solution (a butyl acetate solution having a solid matters content of 5 wt. %) | 365 parts by weight |
| OH group-containing fluororesin composition solution (Defensa TR-103) | 40 parts by weight |
| Urethane resin solution (16-416, produced by DIC Corporation; a MEK-IPA mixed solvent solution having a solid matters content of 30 wt. %) | 40 parts by weight |
| Isopropanol [IPA] | 95 parts by weight |
| Methyl ethyl ketone [MEK] | 95 parts by weight |

A surface-treating agent comprising the above components was prepared, and the same measurement and evaluation as in Example 1 were performed.

Comparative Example 6

| | |
|---|---|
| Fluororesin particle solution (a butyl acetate solution having a solid matters content of 5 wt. %) | 468 parts by weight |
| PE wax solution (a butyl acetate solution having a solid matters content of 5 wt. %) | 468 parts by weight |
| NCO group-containing 1,2-polybutadiene (TP-1001) | 54 parts by weight |
| OH group-containing fluororesin composition solution (Defensa TR-103) | 10 parts by weight |

A surface-treating agent comprising the above components was prepared, and the same measurement and evaluation as in Example 1 were performed.

Comparative Example 7

In Comparative Example 6, the amount of the NCO group-containing 1,2-polybutadiene was changed to 56 parts by weight, and 8 parts by weight of silicone oil (KF-96H-1,000,000 cs) was further used, and the OH group-containing fluororesin composition solution was not used.

Comparative Example 8

In Comparative Example 6, the amount of the fluororesin particle solution and the amount of the PE wax solution were both changed to 470 parts by weight, the amount of the NCO group-containing 1,2-polybutadiene was changed to 60 parts by weight, respectively, and the OH group-containing fluororesin composition solution was not used.

The following table shows the measurement results obtained in the above Examples and Comparative Examples.

TABLE

| Example | Solution stability | Binder hardness | Friction coefficient Measurement value | Friction coefficient Evaluation | Abrasion resistance Measurement value (× 10⁴ times) | Abrasion resistance Evaluation | Product torque Evaluation |
|---|---|---|---|---|---|---|---|
| Ex. 1 | ○ | 17.9 | 0.11 | ○ | 3 | Δ | ○ |
| Ex. 2 | ○ | 15.9 | 0.10 | ○ | 8 | ○ | ○ |
| Ex. 3 | ○ | 14.7 | 0.08 | ○ | 9 | ○ | ○ |
| Ex. 4 | ○ | 17.9 | 0.09 | ○ | 5 | Δ | ○ |
| Ex. 5 | ○ | 15.9 | 0.07 | ○ | 8 | ○ | ○ |
| Ex. 6 | ○ | 14.7 | 0.05 | ○ | 9 | ○ | ○ |
| Ex. 7 | ○ | 18.5 | 0.12 | ○ | 3 | Δ | ○ |
| Comp. Ex. 1 | X | 18.9 | 0.10 | ○ | 2 | Δ | ○ |
| Comp. Ex. 2 | X | 19.0 | 0.10 | ○ | 3 | Δ | ○ |
| Comp. Ex. 3 | X | 26.4 | 0.11 | ○ | 5 | Δ | ○ |
| Comp. Ex. 4 | Δ | 21.5 | 0.11 | ○ | 5 | Δ | ○ |
| Comp. Ex. 5 | ○ | 1.1 | 0.10 | ○ | 0.3 | X | X |
| Comp. Ex. 6 | ○ | 6.7 | 0.12 | ○ | 30 | ◎ | Δ |
| Comp. Ex. 7 | ○ | 6.2 | 0.09 | ○ | 20 | ◎ | Δ |
| Comp. Ex. 8 | ○ | 7.6 | 0.15 | Δ | 3 | Δ | Δ |

The invention claimed is:

1. A surface-treating agent for vulcanized rubber wherein the surface-treating agent comprises, based on 100 parts by weight, as solid matters, of isocyanate group-containing 1,2-polybutadiene, an organic solvent solution containing 10 to 160 parts by weight of fluororesin particles and 2.5 to 20 parts by weight of a perfluoroalkyl group-containing oligomer-based, fluorine-containing surfactant as a dispersant, and further comprises, based on 100 parts by weight, as solid matters, of the isocyanate group-containing 1,2-polybutadiene, 100 parts by weight or less, as solid matters, of a composition solution of an OH group-containing fluororesin composition having the following formulation:
[I] a copolymer of
   (A) a perfluoroalkylalkyl (meth)acrylate and
   (B) a hydroxyl group-containing (meth)acrylate,
[II] a polymer of an acrylic acid alkyl ester,
[III] a polymer of a fluorinated olefin, and
[IV] a curing agent; and/or
60 parts by weight or less of silicone oil having a viscosity of 8,000 cs or more.

2. The surface-treating agent for vulcanized rubber according to claim 1, which is used as a coating agent for a seal lip part of an oil seal.

3. An oil seal having a seal lip part having a coating film formed from the surface-treating agent for vulcanized rubber according to claim 2.

4. An oil seal having a seal lip part having a coating film which is prepared by coating the seal lip part with the surface-treating agent for vulcanized rubber according to claim 2, and then subjecting the coated seal lip to heat treatment at 150 to 250° C.

5. The surface-treating agent for vulcanized rubber according to claim 1, which is used as a coating agent for a seal lip part of an oil seal.

6. An oil seal having a seal lip part having a coating film formed from the surface-treating agent for vulcanized rubber according to claim 5.

7. An oil seal having a seal lip part having a coating film which is prepared by coating the seal lip part with the surface-treating agent for vulcanized rubber according to claim 5, and then subjecting the coated seal lip to heat treatment at 150 to 250° C.

* * * * *